United States Patent [19]

Ecker, Jr. et al.

[11] 4,291,388

[45] Sep. 22, 1981

[54] PROGRAMMABLE CONTROLLER WITH DATA ARCHIVE

[75] Inventors: Donald R. Ecker, Jr., Euclid; Ernst Dummermuth, Chesterland; Odo J. Struger, Chagrin Falls, all of Ohio

[73] Assignee: Allen-Bradley Company, Milwaukee, Wis.

[21] Appl. No.: 971,593

[22] Filed: Dec. 20, 1978

[51] Int. Cl.³ .............................................. G06F 11/16
[52] U.S. Cl. ..................................................... 364/900
[58] Field of Search ... 364/200 MS File, 900 MS File; 365/228, 200, 201; 235/303, 303.3, 303.4, 307; 371/13, 21, 31, 49, 51

[56] References Cited

U.S. PATENT DOCUMENTS

| | | |
|---|---|---|
| 3,643,115 | 2/1972 | Kiffmeyer . |
| 3,745,546 | 7/1973 | Struger et al. . |
| 3,798,612 | 3/1974 | Struger et al. ...................... 364/900 |
| 3,810,116 | 5/1974 | Prohofsky ...................... 365/228 X |
| 3,943,495 | 3/1976 | Garlic ................................... 364/200 |
| 3,992,636 | 11/1976 | Kiffmeyer . |
| 4,019,175 | 4/1977 | Nakao et al. ..................... 364/900 |
| 4,118,789 | 10/1978 | Casto et al. ........................ 364/900 |
| 4,118,792 | 10/1978 | Struger et al. ...................... 364/900 |
| 4,122,519 | 10/1978 | Bielawski et al. .................. 364/200 |
| 4,122,531 | 10/1978 | Tamaru et al. ..................... 364/900 |
| 4,131,942 | 12/1978 | Gillett et al. ...................... 364/200 |
| 4,151,580 | 4/1979 | Struger et al. . |

OTHER PUBLICATIONS

Hodges; D., "Microelectronic Memories", Scientific American, Sep. 1977.

*Primary Examiner*—Gareth D. Shaw
*Assistant Examiner*—Thomas M. Heckler
*Attorney, Agent, or Firm*—Quarles & Brady

[57] ABSTRACT

A programmable controller interfaces a numerical control system to sensing and operating devices that control the auxiliary functions on a machine tool. In the controller a microprocessor is coupled to a random-access memory (RAM) and an electrically alterable read-only memory (EAROM) through an address bus and a data bus. The RAM stores a user control program and an I/O image table that depicts the status of the sensing and operating devices on the machine tool. Under program control the microprocessor verifies the contents of the RAM and copies the verified contents into the EAROM. If the contents of the RAM are altered or lost, the master copy of data stored in the EAROM is reloaded into the RAM.

12 Claims, 10 Drawing Figures

PROGRAMMABLE CONTROLLER WITH DATA ARCHIVE

BACKGROUND OF THE INVENTION

1. Field of the Invention

The field of the invention is programmable controllers, including those controllers which are integrated into numerical control systems as programmable interfaces.

2. Background of the Invention

In programmable controllers and interfaces a random-access read/write memory (RAM) is used to store input/output status data and a user control program, so that the I/O status can be frequently updated and the control program can be easily revised when necessary. The RAM, however, is volatile, i.e., it must be energized at all times to prevent a loss of stored data. Power is provided to the RAM by a main power supply which is connected to an a-c power source and which converts a-c power to d-c power for operation of the RAM.

Memory back-up batteries have been employed in prior programmable controllers to provide standby d-c power to the RAM when a-c power to the main power supply is interrupted. These batteries typically are limited to supplying standby power for a month and have a battery life of one to three years. Even with memory back-up batteries, data can be lost if these battery limits are reached. These batteries also require charging circuits to enable recharging during system operation from an a-c power source.

SUMMARY OF THE INVENTION

The invention is embodied in a digital controller in which a nonvolatile memory and associated digital circuitry are coupled to a random-access read/write memory (RAM). The RAM stores control data that directs the controller in controlling a machine.

The invention includes an erasable, read-mostly memory for nonvolatile storage of control data and first means coupled to both the read/write memory and the read-mostly memory for transferring control data from the read/write memory to the read-mostly memory to form a nonvolatile master copy. Second means are coupled to both the read/write memory and the read-mostly memory for transferring the master copy of control data from the read-mostly memory to the read/write memory.

Data stored in an erasable, read-mostly memory, is nonvolatile. It will not be lost if external power to the memory is interrupted. In an erasable, read-mostly memory, data is read in one operation, and data is written and erased in other operations, which require longer access to the memory than the read operations. In a specific embodiment of the invention described herein, the read-mostly memory is an electrically-alterable read-only memory (EAROM), so called because the write and erase operations are performed electrically as opposed to optically, as in some other read-mostly memories.

The EAROM is used as a data archive where data, such as image tables of status data and a user control program, can be stored without threat of loss due to an interruption of power to the RAM. With the EAROM providing this back-up for the RAM, memory back-up batteries are no longer necessary.

The invention is particularly applicable to programmable controllers and interfaces which execute a user control program of macro-instructions to operate a plurality of devices that control the functions of an industrial machine. The control program operates on data stored in an I/O image table which depicts the status of the operating devices on the machine. Periodically, an I/O scan interrupt routine is executed wherein data is exchanged between the I/O image table and an I/O interface module to actually operate the control devices and obtain updated status information.

The transfer of data between the RAM and the EAROM is conditioned upon the position of a mode switch. The mode switch can be set in a LOAD mode, a TEST mode or a RUN mode. The RUN mode is the normal mode for operating the programmable controller to control the functions of an associated machine. Transfer of data between the RAM and the EAROM occurs only when the mode switch is set in the LOAD mode. The switch position is read by the processor means at a status port address. A decoding circuit and a write enable circuit are connected between the processor means and the EAROM to prevent access to the EAROM for writing or erasing when the mode switch is in a mode other than the LOAD mode. This protects the EAROM from spurious overwriting when the programmable controller is in the RUN or TEST mode.

A watchdog timer circuit is connected between the decoding circuit and a nonmaskable interrupt terminal on the processor means to generate a nonmaskable interrupt signal. The watchdog timer circuit can be controlled by the processor means, however, to inhibit such signals from interrupting the transfer of data between the RAM and the EAROM.

It is one object of the invention to provide a programmable controller in which data stored in a random-access memory is also stored in a data archive memory to protect against its loss.

It is another object of the invention to provide a data archive that can be updated when desired.

It is another object of the invention to protect the data archive from loss of data during the RUN mode of operation when spurious overwriting could otherwise occur.

It is another object of the invention to protect against loss of data from either the RAM or the data archive memory when data is being transferred between them.

It is another object of the invention to eliminate the need for memory back-up batteries and associated circuitry in a programmable controller.

It is still another object of the invention to reduce maintenance requirements for programmable controllers.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is made to the claims for determining the scope of the invention.

BRIEF DESCRIPTION OF THE DRAWINGS

FIG. 10 is a flow chart of an ERROR routine stored in the ROM in FIG. 2.

DESCRIPTION OF THE PREFERRED EMBODIMENT

Figure 1:
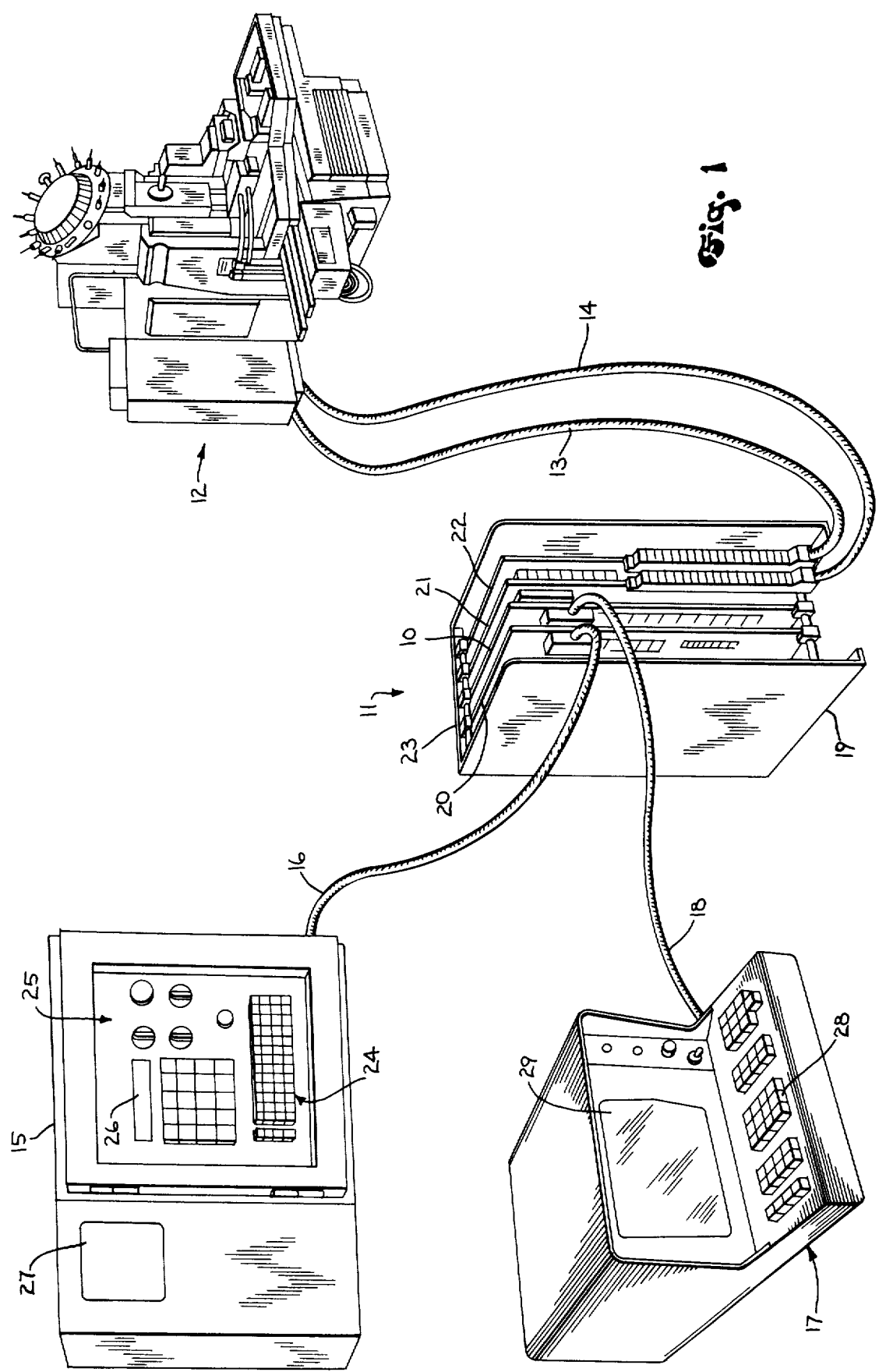
FIG. 1 is a perspective view of a numerical control system in which the present invention is employed.

The invention is embodied in a programmable interface (PI) module 10 in a numerical control system seen in FIG. 1. The numerical control system includes a main control station 11 that is connected to a machine tool 12 through control cables 13 and 14, and a pendent control station 15 that is connected to the main control station 11 through a communication cable 16. A program panel 17 is also connected to the main control station 11 through a communication cable 18.

The main control station 11 is housed in a rack enclosure 19. For a detailed description of this rack enclosure 19, reference is made to U.S. Pat. No. 4,151,580, issued Apr. 24, 1979, and entitled "Circuit Board Assembly with Disconnect Arm." A group of modules, which are printed circuit boards that mount the circuit components described herein, are supported in closely spaced upright positions in the main control station 11. Besides the PI module 10, these modules include a main processor module 20, a servomechanism interface module 21, and an I/O interface module 22.

These modules 10 and 20-22 are connected to one another through a back plane motherboard 23 mounted on the back of the control station rack 19. The main processor module 20 connects to the communication cable 16 and the programmable interface module 10 connects to the communication cable 18. The servomechanism interface module 21 is connected through one control cable 13 to the servomechanisms which control the motion of a cutting tool on the machine tool 12. And, the I/O interface module 22 is connected through the other control cable 14 to a plurality of I/O devices, such as motor starters, limit switches and solenoids which control the auxiliary functions on the machine tool 12. These auxiliary functions include such operations as tool selection, spindle speed, coolant flow and pallet selection.

The pendent control station 15 includes a keyboard 24 and switches 25 for manual entry of data. It also includes an optional alphanumeric display 26 and an optional CRT display 27. The pendent control station 15 encloses a processor (not shown in the drawings) which connects to the communication cable 16 and which processes data from the keyboard 24 and switches 25 and outputs data to the alphanumeric display 26 and the CRT display 27.

The program panel 17 includes a keyboard 28 and a visual display 29. Through the program panel 17 a control program of the type executed by programmable controllers is entered into the PI module 10 and is displayed and edited from time to time. The program panel 17 is a peripheral unit, which need not be operatively connected to the main control station while the machine tool 12 is being operated. Therefore, after the entry or editing of the control program, the control panel 17 may be disconnected from the numerical control system and used to program other controllers.

Figure 2:
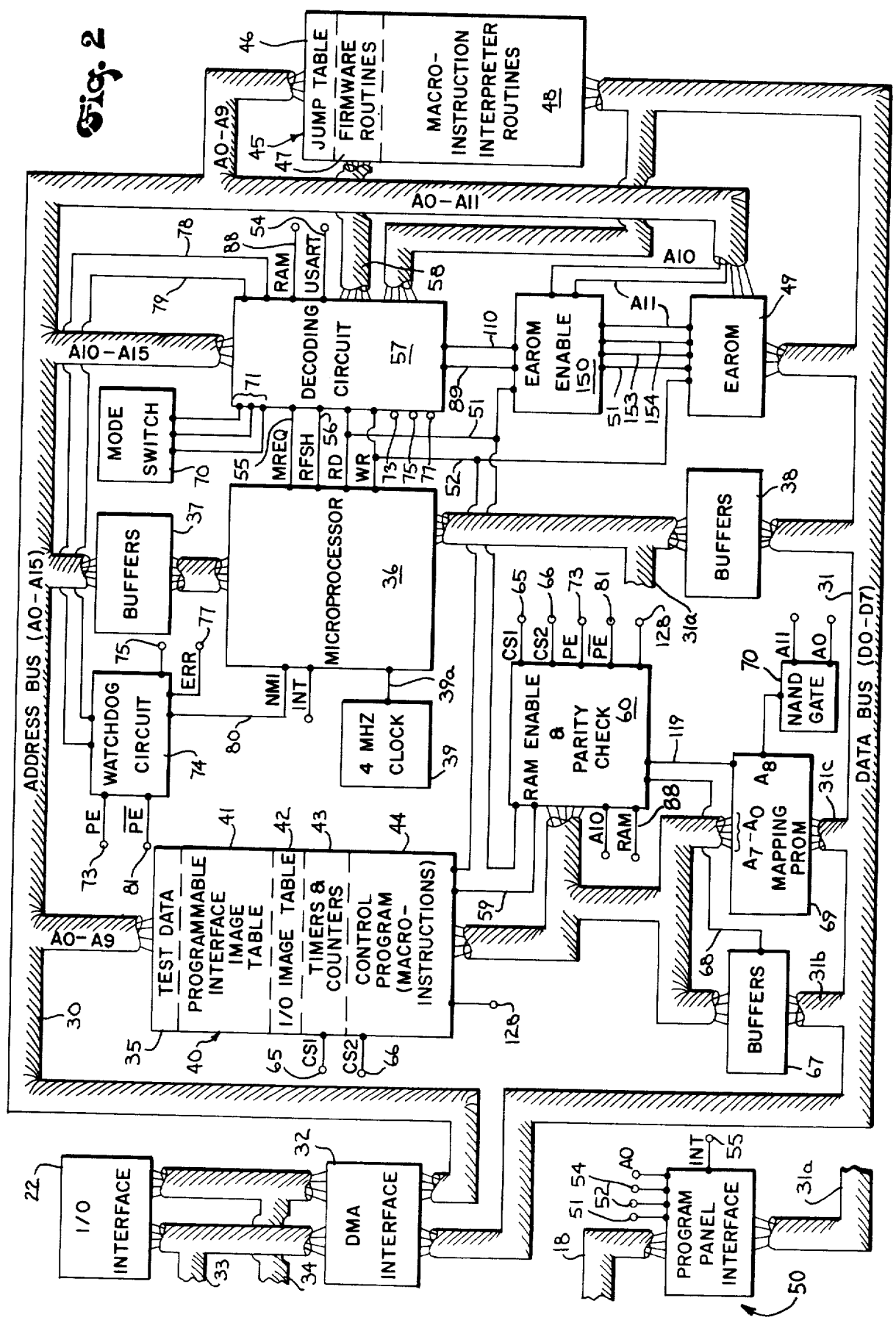
FIG. 2 is a block diagram of a programmable interface module which is part of the system of FIG. 1 and which incorporates the present invention.

As seen in FIG. 2, the PI module 10 is connected through a sixteen-bit (A0-A15) PI address bus 30 and an eight-bit (D0-D7) PI data bus 31 to a DMA interface 32. The DMA interface 32 couples these two buses 30 and 31 to a nineteen-bit (AB0-AB14, EXT0-3) main address bus 33 and a sixteen-bit (DB0-DB15) main data bus 34 on the main processor module 20. For a complete description of the construction and operation of the main processor module 20 and the DMA interface 32, reference is made to a copending patent application entitled "Multiprocessor NC System," which was filed Dec. 19, 1978.

Besides the main processor module 20, the DMA interface 32 also couples the PI module 10 to the I/O interface 32, which is connected to the main address and data buses 33 and 34. The I/O module 22 includes sets of sixteen input circuits and sets of sixteen output circuits. Each input circuit is connected to a sensing device on the machine tool 12, such as a limit switch, and each output circuit is connected to an operating device on the machine tool 12, such as a motor starter or a solenoid. Input circuits which are suitable for this purpose are disclosed in U.S. Pat. Nos. 3,643,115 and 3,992,636, and output circuits which are suitable for this purpose are disclosed in U.S. Pat. No. 3,745,546.

The operation of the programmable interface (PI) module 10 is directed by a microprocessor 36 which is coupled to the PI address bus 30 through a set of buffers 37 and which is coupled to the PI data bus 31 through a set of bidirectional buffers 38. The microprocessor 36, which in this embodiment is a Model Z-80A microprocessor manufactured by Zilog, Inc., is driven through a clock line 39a by a four-megahertz clock circuit 39. Besides the description that follows, reference is also made to the Z80-CPU Technical Manual published in 1976 by Zilog, Inc., for information on the architecture, the operation and the instruction set for this microprocessor 36.

The PI address bus 30 and the PI data bus 31 connect the microprocessor 36 to three memories. The first of these is a random-access memory (RAM) 40 which stores some test location data 35, a programmable interface image table 41, an I/O image table 42, a table of preset and accumulated values of timers and counters 43 and a user control program 44. The RAM 40 can store 2K bytes of data in corresponding address lines with an added parity bit in each line. The second of these memories is a 4K-byte read-only memory (ROM) 45 which stores a table of jump statements 46. It also stores a first group of microprocessor instructions organized in firmware routines 47 and a second group of microprocessor instructions organized in macro-instruction interpreter routines 48. The third memory is a 2K-byte electrically alterable read-only memory (EAROM) 49 which serves as an archive for data stored in the RAM 40, to protect against its loss.

The EAROM 49 is a nonvolatile memory, i.e., data is not lost when power is removed. It is one type of "read-mostly" memory, which is both erasable and programmable, in addition to being readable. Another type of read-mostly memory is the optically erasable read-only memory. Although the apparatus for erasing and programming a specific read-mostly memory is described herein, it should be apparent that the invented data archive can be embodied in other arrangements. For more information on read-mostly memories, reference is made to an article of David A. Hodges, entitled "Microelectronic Memories," in the September, 1977, issue of *Scientific American*.

Data that is transferred to the EAROM 49 from the RAM 40 is user-oriented control data. This data includes status data and control instructions which operate on the status data. The programmable interface image table 41, which is stored on the lowest address lines of the RAM 40, contains data that depicts the status of the NC portion of the system. The I/O image table 42 depicts the status of the sensing devices and the operating devices which control these selected functions on the machine tool 12. The control program 44 contains macro-instructions which examine the status of both the NC portion of the system and the input devices on the machine tool 12, and which set output status bits according to the logic of such instructions.

The programmable interface image table 41 in the RAM is updated by data received from the NC or main portion of the system. The I/O image table 42 is updated during an I/O scan operation in which data is received to indicate the status of input circuits in the I/O interface module 22. During the I/O scan output status data from the I/O image table 42 is coupled to the I/O interface module 22 to set output circuits therein and thereby control output devices on the machine tool 12.

As described in the copending application referred to above, the DMA interface 32 periodically obtains control of the main address and data buses 33 and 34 in response to a DMA request received from the PI microprocessor 36. During a DMA cycle, the DMA interface 32 divides sixteen-bit words on the main data bus 34 into pairs of eight-bit bytes that are sequentially coupled to the PI data bus 31. The DMA interface 32 also couples pairs of eight-bit bytes sequentially received on the PI data bus 31 to form sixteen-bit data words on the main data bus 34. In this way, data can be coupled between the RAM 40 on the PI module 10 and a memory (not shown) on the main processor module 20. The PI microprocessor 36 also signals the DMA interface 32 when an I/O scan cycle is to be performed. After the I/O request signal has been acknowledged, data can be coupled between the I/O image table 42 in the RAM 40 and the I/O interface module 22.

Control program macro-instructions and other data are coupled between the program panel 17 in FIG. 1 and the RAM 40 through a program panel interface 50 seen in FIG. 2. The program panel interface 50 connects one end of the communication cable 18 to a branch 31a of the PI data bus 31 that bypasses the buffers 38 to connect to the microprocessor 36. The program panel interface 50 includes a USART (not shown) which converts between serial data transmitted through the communication cable 18 and parallel data coupled on the PI data bus 31. The microprocessor 36 connects to the interface 50 through a read line 51, a write line 52 and the A0 line in the PI address bus 30. The microprocessor 36 also connects to the interface 50 through a decoding circuit 57 and through a USART enable line 54.

The program panel 17 interrupts the microprocessor 36 through an INT line connecting the program panel interface 50 to the microprocessor 36. The microprocessor 36 then executes a panel interrupt service routine, which is part of the firmware 47 stored in the ROM 45. During execution of this routine the microprocessor 36 transmits logic signals through the read line 51, the write line 52, the USART enable line 54, and the A0 line in the address bus 30 to load, update and read data through front panel interface 50. For further details of the operation of the program panel interface 50, reference is made to the copending application entitled "Multiprocessor NC System" referred to above.

The PI microprocessor 36 controls the coupling of data to the RAM 40, the ROM 45 and the EAROM 49 through the read and write control lines 51 and 52 and lines A10-A15 of the address bus 30. These lines and memory request (MREQ) line 55 and a refresh (RFSH) line 56 are connected to the decoding circuit 57. The ROM 45 is connected to the decoding circuit 57 through a four-line ROM enable bus 58. Data is read from the ROM 45 by generating an address in the ROM 45 on lines A0-A11 of the address bus 30. Lines A0-A9 actually specify the address, while lines A11 and A10 are decoded by the decoding circuit 57 to enable one of four 1K-byte memory chips (not shown) that constitute the ROM 45 through a line in the ROM enable bus 58.

The RAM 40 is also connected to lines A0-A9 of the address bus 30. The RAM 40 is a 2K by nine-bit memory which stores data in eight bits of each line and which stores a parity bit as the ninth bit in each line. The stored parity is read out on a parity bit output line 59 to a RAM enable and parity checking circuit 60 as data is read from the RAM 40. The RAM enable and parity checking circuit 60 is connected to the data bus 31 to receive data read from the RAM 40, and it calculates the parity of this data and compares it to the stored parity received on the parity bit output line 59. The RAM enable and parity checking circuit 60 is connected through a parity error (PE) line 73 and a parity error complement ($\overline{PE}$) line 81 to a watchdog timer circuit 74 to signal a parity error.

The RAM enable function is controlled by the microprocessor 36 through the A10 address line and the read line 51, which connect the microprocessor 36 to the RAM enable and parity checking circuit 60. The RAM 40 is enabled through two chip select (CS1 and CS2) lines 65 and 66 connecting the RAM enable and parity checking circuit 60 to the RAM 40. Through each chip select line 65 and 66, a 1K by nine-bit block of the RAM 40 is enabled for read and write operations.

Data is written into an addressed line of the RAM 40 through a set of input buffers 67 connected in a one-way input branch 31b of the data bus. The input buffers 67 are enabled through a buffer enable line 68 connecting the buffers 67 to the RAM enable and parity checking circuit 60. The buffer enable line 68 is driven by the read line 51 which connects to an input on the RAM enable and parity checking circuit 60. When a memory write instruction is executed by the microprocessor 36, a logic high signal is output on the read line 51 and the buffers are enabled through the buffer enable line 68, so that a byte of data can be stored in the addressed line of the RAM 40.

Data is read from an addressed line of the RAM 40 through a mapping PROM 69 in an output branch 31c of the data bus 31. The mapping PROM 69 is a mask-programmable read-only memory. Each macro-instruction in the control program specifies an operation, e.g., XIC, XIO, and an eight-bit operand address. The operand address specifies a location in the image tables 41-43 of the RAM 40 that contains the data upon which the operation is to be performed. Although programmable controller-type instructions such as XIC, XIO and OTE are standard operations, these operations are translated into different multi-bit binary operation codes by different program loaders and microprocessors. Both the number and identity of digits can vary from one operation code to another. To make the microprocessor 36 compatible with a program panel 17 that uses different binary operation codes, the mapping PROM 69, which has eight address terminals A7-A0 coupled to the RAM 40 and eight data terminals coupled to the PI data bus 31, is programmed as follows.

In the RAM 40 operand addresses are stored on even-numbered address lines while operation codes are stored on odd-numbered lines. The stored operation codes are those used by the program panel 17 and read into the RAM 40 through the data input buffers 67. The mapping PROM 69 is a 512-line by eight-bit memory where operation codes recognized by the microprocessor 36 are stored in the lower 256 addresses, and operand addresses are stored in the upper 256 addresses. The upper 256 addresses merely provide a one-to-one mapping of data read from the RAM 40 with each line storing its own identity. Partitioning of the mapping PROM 69 is controlled through lines A0 and A11 of the address bus which are connected through a NAND gate 70 to the upper address terminal (A8) on the mapping PROM 69.

When a logic low signal is transmitted on the A11 address line, a logic high signal is input to the address terminal A8 on the mapping PROM, the upper 256 lines are addressed, and a one-to-one mapping of data occurs. This allows data to be read from the image tables 41-43. When the A11 address line carries a logic high signal, the mapping PROM 69 is in its translating mode of operation, and addressing is controlled by the signal on the A0 address line. A logic low signal on the A0 address line occurs when an operand address on an even-numbered line of the RAM 40 is addressed, thereby applying a logic high signal to the A8 address terminal on the mapping PROM 69 and providing the one-to-one mapping of operand addresses. On the other hand, a logic high signal on the A0 address line occurs when an odd-numbered line of the RAM containing an operation code is addressed. A logic low signal is then applied to the A8 address terminal on the mapping PROM 69 and translated operation codes are sent out on the PI data bus 31. These translated codes are read and executed by the microprocessor 36. The inclusion of the mapping PROM 69 in this PI module 10 allows a single program panel 17 to be used with another programmable controller as well as the programmable interface of the present invention.

Besides decoding control signals from the microprocessor 36, the decoding circuit 57 can be addressed through lines A10-A15 of the address bus 30 to read the status of various circuits in the PI module 10. Eight status bits can be read through the PI data bus 31 on lines D0-D7. A single-pole, three-position mode switch 70 is connected to the decoding circuit 57 through three inputs, so that its status can be read through the PI data bus 31. The RAM enable and parity checking circuit 60 is connected to another decoding input through the parity error (PE) line 73. The watchdog timer circuit 74 is connected to another decoding input through a watchdog status line 75 and to still another decoder input through an ERR status line 77.

The decoding circuit 57 is also connected to the watchdog timer circuit 74 through a kick dog line 78 and a dog reset line 79. The watchdog timer circuit 74 responds to malfunctions in the operation of the PI module 10 by "timing out" and generating a nonmaskable interrupt (NMI) signal on an NMI line 80 connected to an input on the microprocessor 36. The watchdog timer circuit 74 is also connected through the parity error (PE) line 73 and a parity error complement ($\overline{PE}$) line 81 to the RAM enable and parity checking circuit 60. Through these lines 73 and 81 parity errors are signaled to the watchdog timer circuit 74 and it generates a nonmaskable interrupt signal on the NMI line 80.

Figure 3:
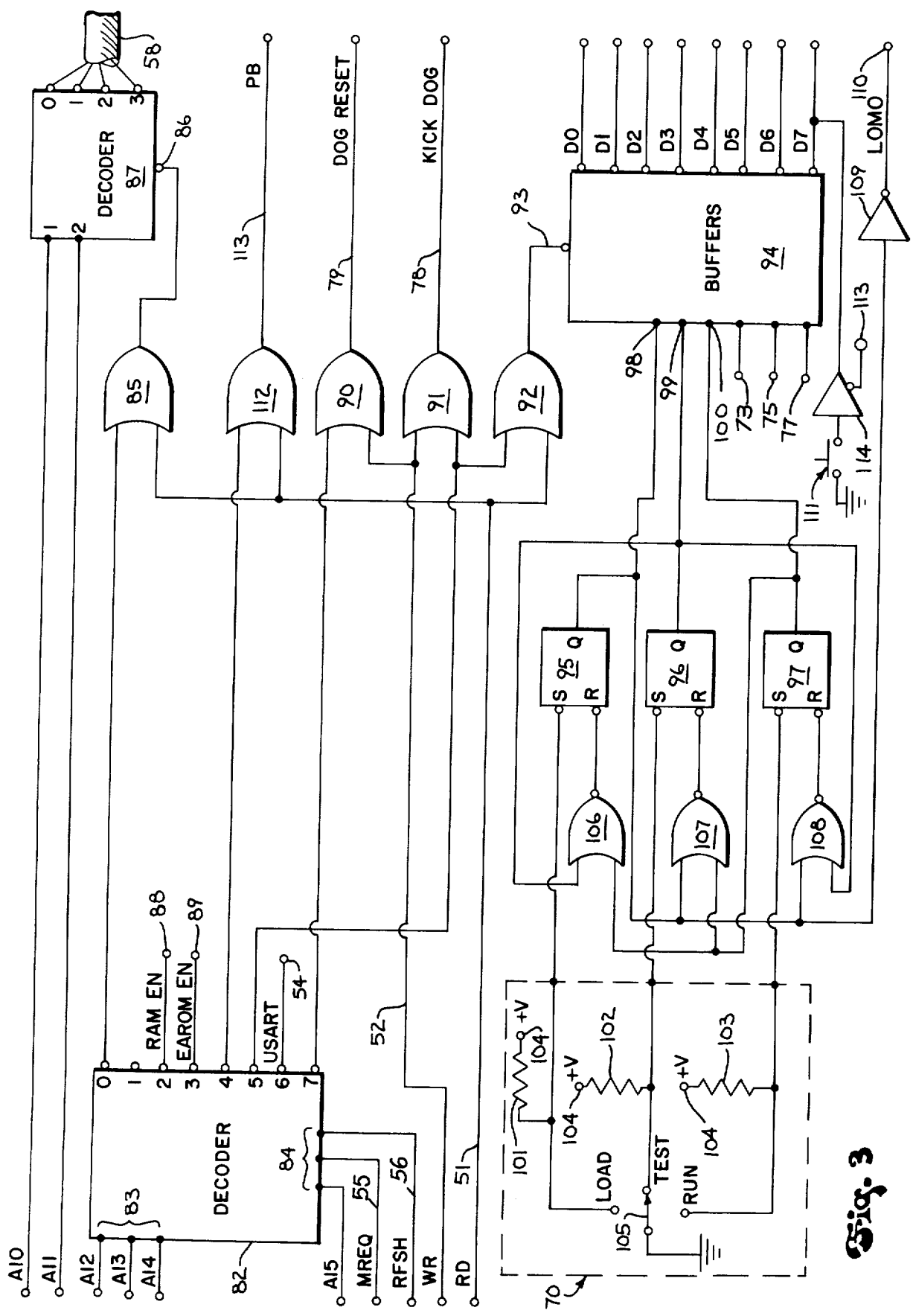
FIG. 3 is a schematic diagram of a decoding circuit represented in FIG. 2.

The decoding circuit 57, the RAM enable and parity checking circuit 60, and the watchdog timer circuit 74 will now be described in more detail. Referring to FIG. 3, the decoding circuit 57 more particularly includes a three-line-to-eight-line decoder 82 having address lines A12, A13 and A14 connected to three inputs 83 and having the A15 address line, the memory request line 55, and the refresh line 56 connected to three enable inputs 84. A "0" output on the decoder 82 and the read line 51 are connected to two respective inputs on an OR gate 85. The output of this OR gate 85 is connected to an enable input 86 on a two-line-to-four-line decoder 87. This decoder 87 has four outputs connected to respective lines in the ROM enable bus 58, and two other inputs connected to the A10 and A11 address lines. Logic signals on these address lines will determine which 1K block of the ROM 45 will be enabled. When data is being written to the RAM 40 and the EAROM 49, the decoder 87 will have its outputs disabled by logic signals on the read line 51 and lines A12-A14 of the address bus 30.

A RAM enable line 88, an EAROM enable line 89 and the USART enable line 54, are connected to the "2," "3" and "6" outputs of the three-line-to-eight-line decoder 82. The "7" output on the decoder 82 and the write line 52 are coupled through an OR gate 90 to the dog reset line 79. The "5" output on the decoder 82 and the write line 52 are coupled through one OR gate 91 to the kick dog line 78, and the "5" output and the read line 51 are coupled through another OR gate 92 to a buffer enable line 93. The buffer enable line 93 is connected to a set of buffers 94 which are enabled when a status port is addressed through lines A12-A14 of the PI address bus 30. An address of 7,000 (hexadecimal) on the PI address bus 30 will enable the buffers 94, so that the status of circuits connected to its inputs can be read.

The mode switch 70 is connected through three flip-flops 95-97 to three inputs 98-100 on the set of buffers 94. These inputs 98-100 are coupled by the buffers 94 to lines D2-D4, respectively, of the PI data bus 31. The mode switch 70 includes three stationary contacts associated with the LOAD, TEST and RUN modes, respectively, which are pulled high through pull-up resistors 101-103 by a d-c voltage source 104. A grounded, movable contact 105 pulls the line connected to one of the stationary contacts to a logic low level. In FIG. 3, the line connected to the TEST contact is pulled low. The LOAD, TEST and RUN switch contacts are connected to the S (set) terminals on the three flip-flops 95-97. The Q outputs of these flip-flops 95-97 are connected through NOR gates 106-108 to R (reset) terminals on each other pair of flip-flops 95-97.

The setting of the mode switch 70 in the TEST mode generates a logic high signal at the Q output of the flip-flop 96, while logic low signals are maintained at the Q outputs of flip-flops 95 and 97. If the movable contact 105 were to be switched to the LOAD position, the Q output on flip-flop 95 would switch to a logic high level, and this signal would be returned through the NOR gate 107 to reset the TEST flip-flop 96. Furthermore, the logic high signal would be coupled through an inverter 109 to produce a logic low signal on a LOMO line 110.

The PE line 73, the watchdog status line 75 and the ERR line 77 are connected through the buffers 94 to lines D5–D7, respectively, of the PI data bus 31. The D7 line in the data bus is also connected to read the status of a pushbutton 111. To enable the status to be read, the "4" output on the three-line-to-eight-line decoder 82 and the read line 51 are coupled through an OR gate 112 to a pushbutton read enable line 113. This line 113 connects to a buffer gate 114 coupling the pushbutton 111 to the D7 line, and when the "4,000" hexadecimal address is generated, the gate 114 is enabled so that the status of the pushbutton 111 can be read. The pushbutton 111 indicates a user command to copy data from the RAM 40 into the EAROM 49 for permanent storage.

Figure 5:
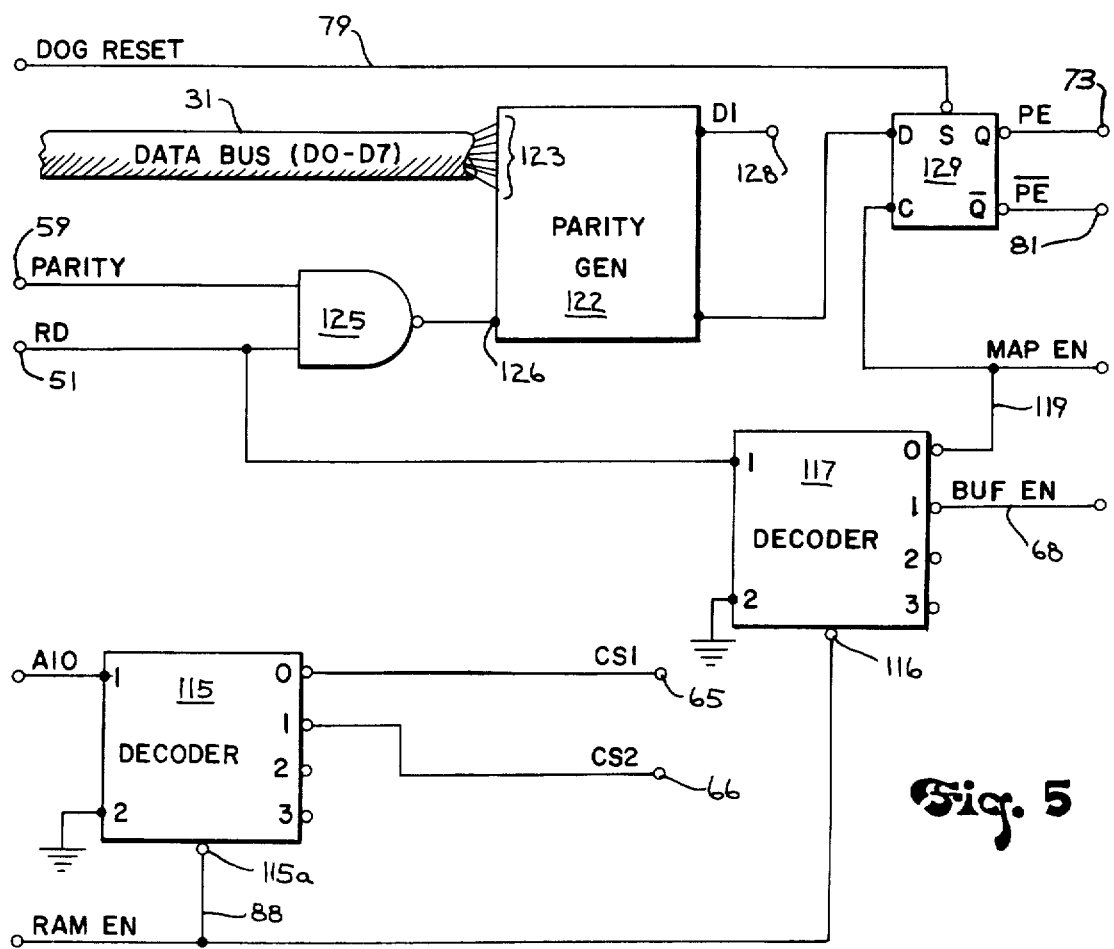
FIG. 5 is an electrical schematic diagram of a RAM enable and parity checking circuit represented in FIG. 2.

Referring to FIG. 5, the RAM enable and parity checking circuit 60 more particularly includes a two-line-to-four-line decoder 115 having a "1" input connected to receive signals on the A10 address line, and having a "2" input that is grounded. The decoder 115 has its "0" and "1" outputs connected to the chip select lines 65 and 66 and an enable input 115a connected to receive logic signals on the RAM enable line 88. When the decoder 115 is enabled through the RAM enable line 88, the enabline of alternate 1K by nine-bit blocks of the RAM 40 is controlled by high and low logic signals on the A10 address line.

The RAM enable line 88 also connects to an enable input 116 on another two-line-to-four-line decoder 117. The read line 51 is connected to a "1" input on this decoder 117, and the "2" input is grounded. A logic low signal on the read line 51 enables the mapping PROM 69 (seen in FIG. 2) through a map enable line 119 connected to the "0" output in the decoder 117. A logic high signal on the read line 51 enables the input buffers 68 (also seen in FIG. 2) through the buffer enable line 68 connected to the "1" output on the decoder 117.

The parity checking portion of the circuit 60 includes a parity generator 122 having eight inputs 123 connected to the PI data bus 31 to receive data. The parity data output line 59 and the read line 51 are connected through a NAND gate 125 to another input 126 on the parity generator 122. The parity data output line 59 is connected to a parity data output on the RAM 40, as seen in FIG. 2. When data is read from the RAM 40, a stored parity bit is received at the single input 126 of the parity generator 122 and compared with the data received on the PI data bus 31. When data is written into the RAM 40, the parity generator 122 calculates the parity of the data and the calculated parity is written into the RAM through a parity data input line 128 connecting the parity generator to the RAM, as seen in FIG. 2.

Referring to FIG. 5, each calculated parity sum is also transmitted through a line to a D input on a parity error flip-flop 129. The dog reset line 79 connects to an S (set) terminal on this flip-flop 129, and the map enable line 119 connects to a clock input on this flip-flop. The Q output on the flip-flop 129 is connected to the parity error (PE) line 73, and the $\overline{Q}$ output is connected to the parity error complement ($\overline{PE}$) line 81. When data read from the RAM 40 has a faulty parity, a logic high signal is received at the D input of the flip-flop 129 while the clock input is enabled, to reset the flip-flop 129 and indicate a parity error. Parity errors are cleared by setting the parity error flip-flop 129 through the dog reset line 79.

Figure 6:
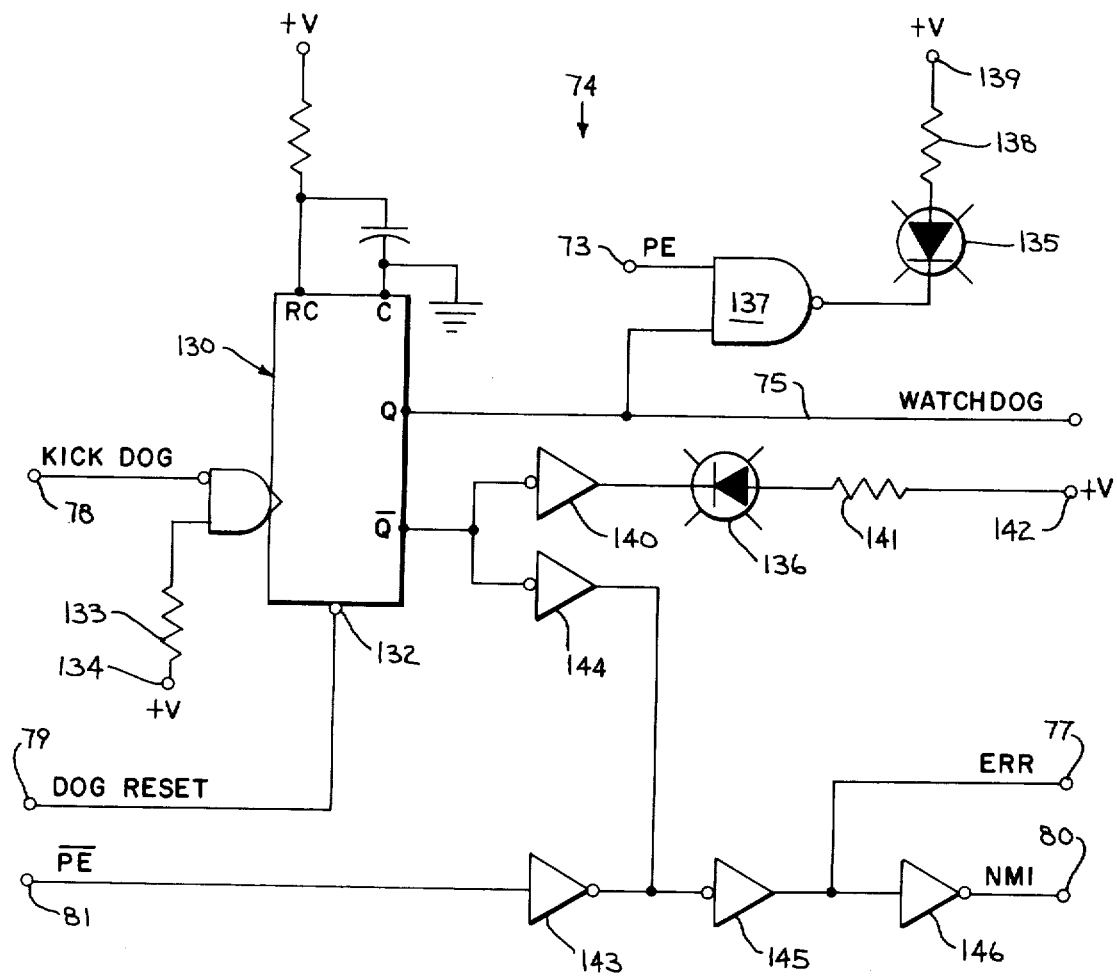
FIG. 6 is an electrical schematic diagram of a watchdog timer circuit represented in FIG. 2.

The RAM enable and parity checking circuit 60 is connected through the PE and $\overline{PE}$ lines 73 and 81 to the watchdog timer circuit 74 seen in FIG. 6. The main component of the watchdog timer circuit 74 is a multivibrator which is connected to an RC coupling circuit to form a monostable multivibrator 130. The monostable multivibrator 130 remains in an unstable state for a time period of approximately 70 milliseconds before returning to its stable state. The kick dog line 78 is connected to a dual input clock terminal on the multivibrator 130 and the dog reset line 79 is connected to a reset terminal 132. The other clock input is pulled high through a resistor 133 by a d-c voltage source 134. A Q output on the multivibrator 130 is connected to the watchdog status line 75 and a $\overline{Q}$ output is connected through two inverters 144 and 145 to the ERR line 77 and through yet an additional inverter 146 to the NMI line 80.

In the watchdog circuit 74, one LED (light-emitting diode) 135 is provided to indicate satisfactory operation of the PI module 10 while another LED 136 is provided as a fault indicator. The Q output is connected with the PE line 73 to a NAND gate 137 that has its output connected through the LED 135 and a pull-up resistor 138 to a d-c voltage source 139. A logic high signal on the watchdog status line 75 in the absence of a parity error signal on a PE line 73 causes the illumination of the LED 135. The $\overline{Q}$ output is connected through an inverter 140, the other LED 136, and a pull-up resistor 141 to a d-c voltage source 142, to indicate when the watchdog timer 74 has "timed out."

This occurs when the multivibrator 130 is reset, or when a parity error is indicated on the $\overline{PE}$ line 81. The $\overline{PE}$ line 81 is connected through an inverter 143 in a "wired or" connection with the line coming from the $\overline{Q}$ output terminal through another inverter 144. When a logic high voltage signal is present at the $\overline{Q}$ terminal or on the $\overline{PE}$ line 81, a nonmaskable interrupt signal will be generated. The second LED 136 will be illuminated and the error can be read on the ERR line 77.

The watchdog timer 74 can also be prevented from generating an interrupt signal on the NMI line 80. If the multivibrator 130 is reset, but not started through the kick dog line 78, and the $\overline{PE}$ line 81 is held low, an interrupt signal cannot be generated on the NMI line 80.

Referring to FIG. 2, the coupling of data to the EAROM 49 is controlled through an EAROM enable circuit 150, which has inputs connected to the read line 51, the EAROM enable line 89, the LOMO line 110 and the A10 and A11 address lines. The write line 52 and lines A0–A9 of the address bus 30 are connected directly to the EAROM 49, while the A11 address line, the read line 51 and two chip enable lines (CE1 and CE2) 153 and 154 connect the EAROM enable circuit 150 to the EAROM 49.

Figure 4:
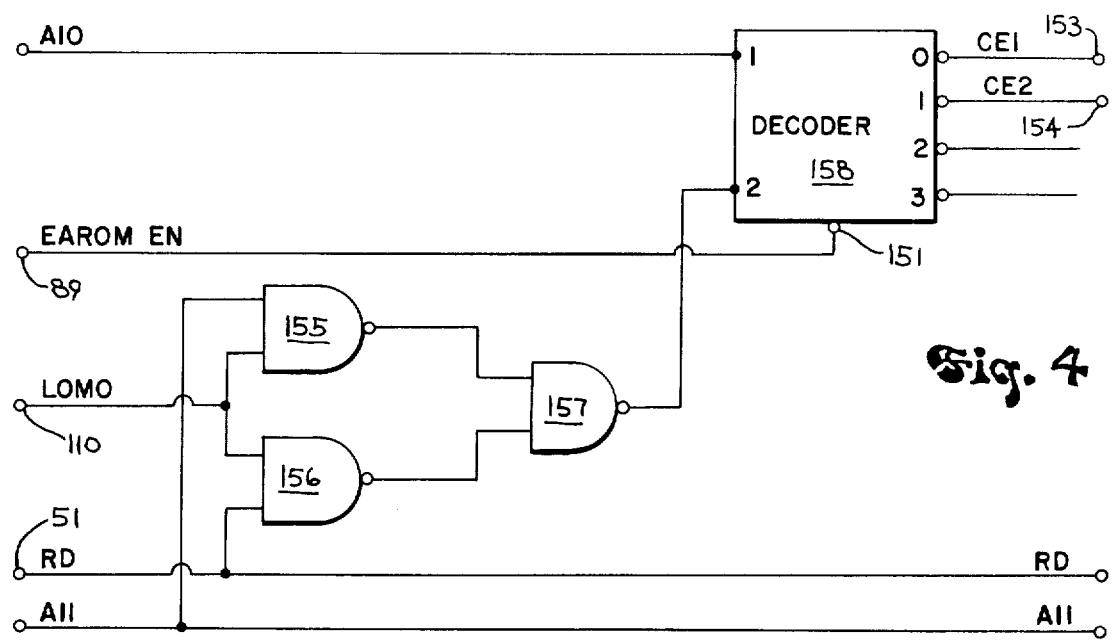
FIG. 4 is an electrical schematic diagram of an EAROM enable/disable circuit represented in FIG. 2.

Referring to FIG. 4, the EAROM enable circuit 150 more particularly includes two NAND gates 155 and 156 with their outputs coupled through a NAND gate 157 to a "2" input terminal on a two-line-to-four-line decoder 158. The LOMO line 110 is connected to one input on each NAND gate 155 and 156; the read line 51 is connected to the other input on one NAND gate 156; and the A11 address line is connected to the other input on the other NAND gate 155. The A10 address line is connected to the "1" input on the decoder 158 and the EAROM enable line 89 is connected to an enable input 151. The two EAROM chip enable (CE1 and CE2) lines 153 and 154 are connected to the "0" and "1" outputs of the decoder 158.

Two 1K by eight-bit blocks of the EAROM 49 are alternatively enabled through the CE1 and CE2 lines 153 and 154. The selection of one of these lines is controlled by the logic signal on the A10 address line, provided that the outputs of the decoder 158 are enabled through the EAROM enable line 89. To protect the EAROM 49 from spurious overwriting, the EAROM 49 is disabled for writing and erasing except when the mode switch 70 is set for operation in the LOAD mode. When a logic high signal is present on the LOMO line 110, the chip enable lines 153 and 154 will disable the EAROM for writing and erasing, although data can still be read.

The A11 address line and the read line 51 provide an erase function for the EAROM 49 in response to logic high voltage signals. The EAROM 49 is prevented from receiving these signals, however, unless the mode switch is in the LOAD mode, as signalled through the LOMO line 110. Signals coupled to the EAROM 49 through the write line 52 seen in FIG. 2 are also conditioned upon the status of the LOMO line 110. With the mode switch in the LOAD position, the EAROM 49 is enabled through the EAROM enable line 89, and data can be read, written or erased according to signals provided on the read line 51, the write line 52 and the A11 address line.

The microprocessor 36 is operated in response to timing signals received from the clock 39 to read and execute instructions in the firmware routines 49 stored in the ROM 45. The microprocessor 36 repeatedly executes a FETCH routine stored in the ROM 45 to read macro-instructions (including both an operation code and an operand address) from the RAM 40. As explained previously, the two bytes in the macro-instruction are read out through the mapping PROM 69 and the data bus 31 to the microprocessor 36. The FETCH routine used in obtaining the macro-instructions is listed in Table 1 below.

TABLE 1

| Instruction Mnemonic | Comment |
|---|---|
| POP HL | Get next instruction; store the operand address in the L register and store the operation code in the H register. |
| LD E,L | Load operand address (the low byte of the macro-instruction) into the E register. |
| LD L,H | Form the address in HL which |
| LD H,C | specifies a location in a jump table 46 in the ROM 45. |
| JP (HL) | Jump indirect via the jump table 46 in the ROM 45. |

The microprocessor 36 makes use of a number of internal registers in executing the FETCH routine, which will become apparent by reference to the Z80-CPU Technical Manual, referred to above. These registers include:

PC, a sixteen-bit program counter;
SP, a sixteen-bit stack pointer;
B and C, eight-bit registers arranged as a pair;
D and E, eight-bit registers arranged as a pair; and
H and L, eight-bit registers arranged as a pair.

The program counter PC stores the memory address of the current machine instruction to be read from the ROM 45. While this instruction is being read from the ROM 45 the program counter PC is incremented for addressing the next line of the ROM 45. The stack pointer SP stores the memory address of the programmable controller-type instruction to be read from the RAM 40. It is initialized to point at the first macro-instruction in the control program 44, and as each macro-instruction is fetched, the stack pointer SP is incremented two counts to address the next controller instruction.

The translated operation code that is read from the mapping PROM 69 as part of each macro-instruction is, in fact, an address in the jump table 46 in the ROM 45. Each macro-instruction must be linked with one of the interpreter routines 48 in the ROM 45. This is done via the jump table 46 which contains instructions to jump to the address of a first instruction in a corresponding interpreter routine 48. When the microprocessor 36 executes the operation code of each macro-instruction, it jumps to the first instruction in one of the interpreter routines 48 in the ROM 45. The last portion of each interpreter routine includes the FETCH routine, which is executed to fetch the next macro-instruction.

Where macro-instructions are used to manipulate single bits of data, eight distinct operation codes corresponding to the bits of data to be manipulated are required. A typical macro-instruction interpreter routine for XIC2 is given below in Table 2. This interpreter routine 48 examines bit 2 of an input status byte in the I/O image table 41. This bit represents the status of some relay contacts (not shown).

TABLE 2

| Instruction Mnemonic | Comment |
|---|---|
| LD A,(DE) | Load operand in the A register. |
| BIT 2,A | Test the specified bit. |
| JR NZ,FETCH | Return to fetch next macro-instruction if bit 2 = 1 (which represents closed contacts). |
| RES O,B | Reset rung status if bit 2 = 0 (representing open contacts). |

FETCH

While the firmware routines 47 and the macro-instruction interpreter routines 48 are not intended to be altered, the flexibility of programmable controllers and programmable interfaces depends upon the ability to edit and update the control program macro-instructions 44 in the RAM 40. In prior controllers, the RAM 40 would require power from a back-up battery during periods when the controller was not being operated, to preserve the contents of the RAM 40. In the PI module 10 of the present invention, the EAROM 49 and associated control circuitry provide a back-up to the RAM 40, which makes the use of back-up batteries unnecessary.

The ROM 45 stores the jump table 46 in lines with addresses from 000 to 00FF (hexadecimal). The firmware routines 47 are stored in lines 0100 to 0495 (hexadecimal). The macro-instruction interpreter routines are stored in the ROM 45 at addresses above 0497 (hexadecimal). It is certain firmware routines 47 which instruct the microprocessor 36 to transfer data between the RAM 40 and the EAROM 49. These routines are set forth in Appendices A-D. Addresses of certain locations in the memories 40, 45 and 49, as well as addresses of hardware on the PI module 10 are given in Appendix E.

Figure 7:
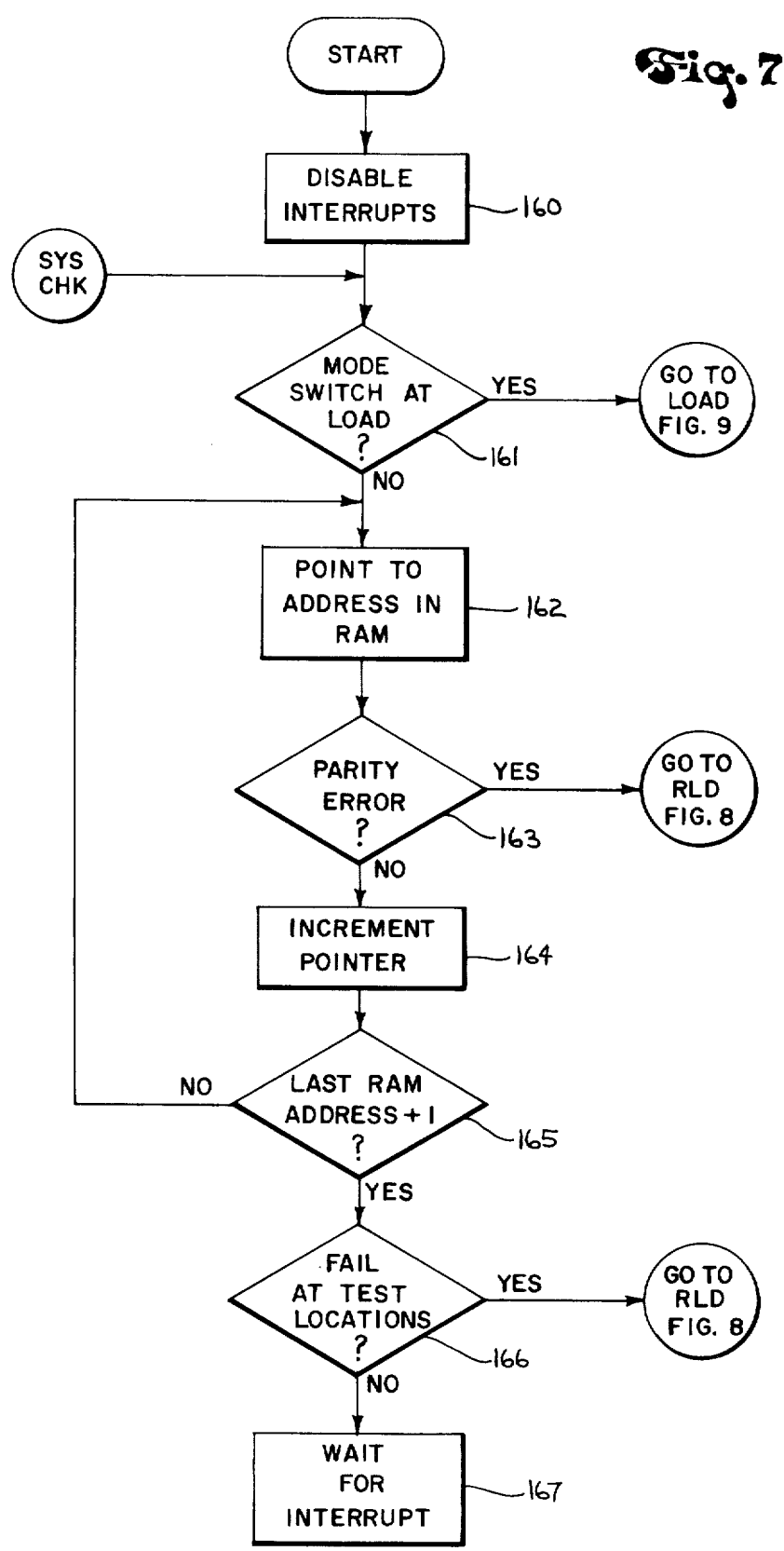
FIG. 7 is a flow chart of an INITIALIZATION routine stored in the ROM in FIG. 2.

An INITIALIZATION routine is set forth in Appendix A and represented in a flow chart in FIG. 7. The first instruction executed by the microprocessor 36 is a jump to the INITIALIZATION routine, this jump instruction being stored at address 0000 (hexadecimal) in the ROM jump table 46. Referring to FIG. 7, the microprocessor 36 first disables both maskable and nonmaskable interrupts as represented by process block 160. The nonmaskable interrupt is disabled by clearing the parity error flip-flop 129. The parity error flip-flop 129 is addressed and cleared through lines A10-A15 of the address bus 30 and the decoding circuit 57 as explained previously. The instruction that is executed to clear the parity error flip-flop 129 is given in Appendix A.

The microprocessor 36 then enters a system check (SYS CHK) portion of the INITIALIZATION routine in which the mode switch 70 is examined as seen in decision block 161 to determine whether it is in the LOAD mode. If the mode switch 70 is set in the LOAD mode, the microprocessor 36 branches and begins the LOAD NEW PROGRAM routine in FIG. 9. If the mode switch 70 is not set in the LOAD mode, the microprocessor 36 loads a starting address in the RAM 40 in the HL register pair as represented in process block 162. It then reads the processor status through the status port in the decoding circuit 57 to check for a parity error, as represented in decision block 163. If a parity error is detected, the microprocessor 36 then jumps to a RELOAD routine in FIG. 8. If there is no parity error, the pointer in the register pair HL is incremented, as represented in process block 164, and as shown in decision block 165, this address is tested to determine whether it is greater than the last address in the RAM 40. The microprocessor 36 loops back to process block 162 to test the parity of the data in the next address until all of the data in the RAM 40 has been checked. When all of the data has been checked, the microprocessor 36 checks data at two test locations, as shown in decision block 166. If this test fails, the microprocessor 36 again jumps to the RELOAD routine in FIG. 8. If the test is successful, the interrupts are enabled and the microprocessor 36 waits for an interrupt to begin one of the interrupt firmware routines 47, as represented in process block 167.

Figure 8:
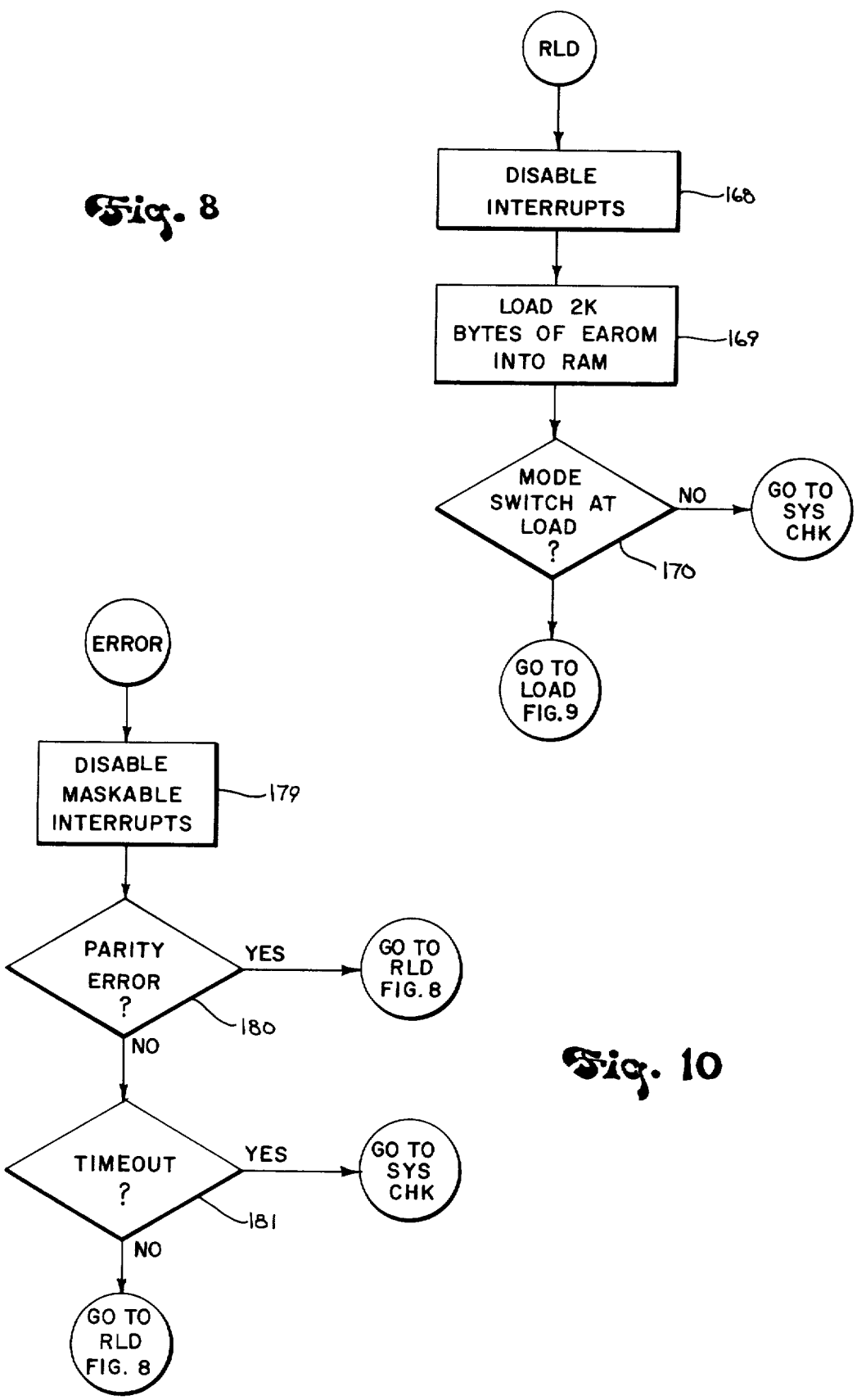
FIG. 8 is a flow chart of a RELOAD routine stored in the ROM in FIG. 2.
Figure 9:
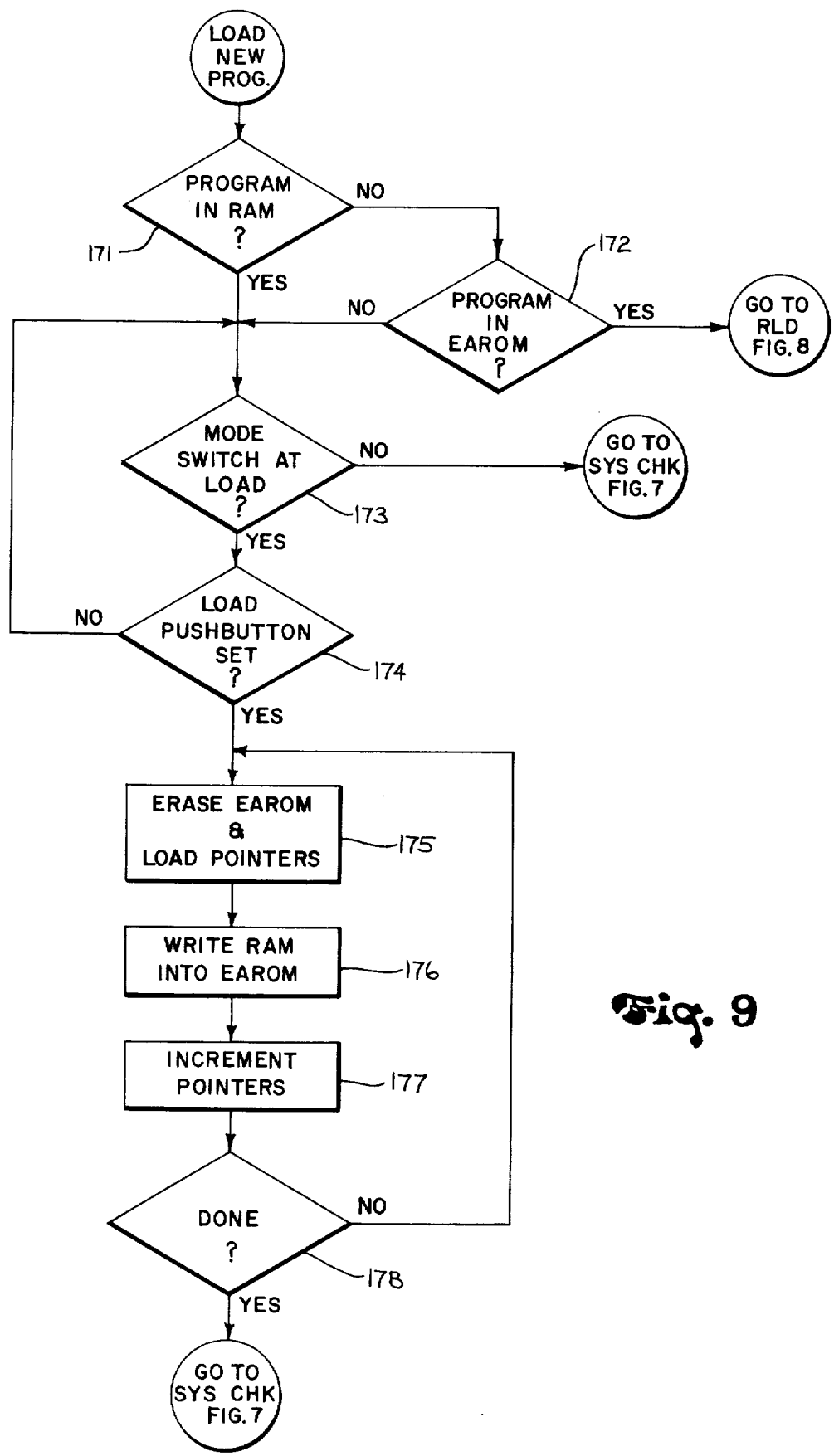
FIG. 9 is a flow chart of a LOAD NEW PROGRAM routine stored in the ROM in FIG. 2.

From this description it can be seen that during initialization the data in the RAM 40 is checked and if it is faulty a RELOAD routine is executed to reload the master copy of the data tables and test data 35 and 41-43 and the user control program 44 from the EAROM 49 into the RAM 40. Referring to FIG. 8, the RELOAD routine begins as seen in process block 168 with a disabling of both maskable and nonmaskable interrupts, so that data will not be lost due to an interrupt while the RAM 40 is being reloaded. Next 2K lines of data are loaded from the EAROM 49 into the RAM 40 as shown in process block 169. The mode switch 70 is then checked as shown in decision block 170 to determine whether it is in the LOAD mode. If the mode switch 70 is not set in the LOAD mode, the microprocessor 36 returns to the system check portion of the INITIALIZATION routine to check the data in the RAM 40. If the mode switch 70 is set in the LOAD mode in decision block 170, the microprocessor proceeds to the LOAD NEW PROGRAM routine in FIG. 9.

During the LOAD NEW PROGRAM routine, interrupts are enabled to allow input from the program panel 17. The RAM 40 is checked as shown in decision block 171 to determine whether a program is present in the RAM 40. If a program is not present in the RAM 40, a check is made as represented in decision block 172 to determine whether a program is present in the EAROM 49. If the result of this check is affirmative, the microprocessor 36 goes back to the RELOAD routine to reload the master copy of data in the EAROM 49 into the RAM 40. As represented in decision block 173, if there is a program present in the RAM 40, or if there is no program present in either the RAM or the EAROM, a check is made to determine whether the mode switch 70 is in the LOAD mode. If the mode switch 70 is not in the LOAD mode, the microprocessor 36 returns to the system check portion of the INITIALIZATION routine in FIG. 7 to check the accuracy of the data in the RAM 40.

If the mode switch 70 is in the LOAD mode in decision block 173, the LOAD pushbutton 111 is examined as represented by decision block 174 to determine whether a new program in the RAM 40 should be loaded into the EAROM 49 to form a new master copy. If the LOAD pushbutton 111 is not set, the microprocessor 36 enters a program loop until either the mode switch 70 is switched to another mode or until the LOAD pushbutton 111 is set. If the LOAD pushbutton 111 is set, the microprocessor 36 erases the EAROM as represented in process block 175 and then writes the data from the RAM into the EAROM line by line in process blocks 176 and 177, checking to see when all of the data has been transferred in decision block 178. When the contents of the RAM have been transferred to the EAROM 49, the microprocessor 36 returns to the system check portion of the INITIALIZATION routine in FIG. 7. Once a correct copy of the data has been stored in both the RAM 40 and the EAROM 49, the microprocessor 36 will wait for an interrupt as represented in process block 167 at the end of the initialization routine.

Besides establishing the image tables 41-43 to the user control program 44 in the RAM 40 and the EAROM 49 during system start-up, the microprocessor 36 also reloads the data master copy from the EAROM 49 into the RAM 40 when a fault is encountered during execution of other firmware routines 47. When a fault occurs, an ERROR interrupt routine is executed, as seen in FIG. 10. Maskable interrupts are disabled in process block 179 and processor status is read and checked as seen in decision block 180 to determine whether the error is in fact a parity error. If it is, the microprocessor 36 then executes the RELOAD routine discussed above. If the error is not a parity error, the microprocessor 36 checks the watchdog timer 74, as represented by decision block 181 to deterine whether it has "timed out." If it has, the microprocessor 36 returns to the system check portion of the INITIALIZATION routine. Otherwise, the microprocessor 36 determines the error interrupt to be a false alarm and reloads the RAM 40 from the EAROM 49 to preclude any possibility of an error passing into the RAM undetected.

Appendix A

INITIALIZATION ROUTINE

| Address | Contents | | Instruction Mnemonic | | Comment |
|---|---|---|---|---|---|
| 0100 | F3 | PTO | DI | | DISABLE INTR |
| 0101 | 320070 | | LD | (PARI),A | CLR INITIAL PARERR |
| 0104 | 3E7E | | LD | A,MODE | SET USART MODE |
| 0106 | 320160 | | LD | (UCA),A | SELECTION |
| 0109 | FD211820 | | LD | IY,FLAG | IY→FLAG |
| 010D | 210520 | | LD | HL,AOON | CLEAR FORCED |
| 0110 | AF | | XOR | A | I/O TABLE |
| 0111 | 061A | | LD | B,1AH* | |
| 0113 | 77 | CLO | LD | (HL),A | |
| 0114 | 2C | | INC | L | |
| 0115 | 10FC | | DJNZ | CLO-$ | |
| 0117 | 210120 | | LD | HL,BLKCT | CLEAR INS/REM COUNT |
| 011A | 77 | | LD | (HL),A | |
| 011B | 3E37 | | LD | A,COMD | SET USART |
| 011D | 320160 | | LD | (UCA),A | COMMAND |
| 0120 | 310048 | | LD | SP,4800H | POINT SP AT EMPTY MEM |
| 0123 | ED56 | | IM | 1 | SET INTERRUPT MODE 1 |
| 0125 | 3A0060 | | LD | A,(UDA) | DUMMY READ TO RESET DSR |
| 0128 | F3 | SYSCK | DI | | NO MASKABLE INTR TIL RDY |
| 0129 | 0600 | | LD | B,008 | CLEAR B-FLAGS |
| 012B | 211820 | | LD | HL,FLAG | INITIALIZE THE |
| 012E | 3638 | | LD | (HL),38H | FLAG REGISTER |
| 0130 | 210020 | | LD | HL,RAM | PREPARE TO CHECK RAM |
| 0133 | 110050 | | LD | DE,STATP | DE POINTS TO PROC. STAT. |
| 0136 | 1A | | LD | A,(DE) | FETCH PROCESSOR STATUS |
| 0137 | 07 | | RLCA | | AND ROTATE TO MATCH PLC-2 |
| 0138 | 320420 | | LD | (STAT),A | AND STORE IT |
| 013B | 1A | | LD | A,(DE) | FETCH PROCESSOR STATUS |
| 013C | CB57 | | BIT | 2,A | LOAD MODE? |
| 013E | C27402 | | JP | NZ,LOADMO | YES, GO LOAD NEW PROG |
| 0141 | 7E | CKLOOP | LD | A,(HL) | READ EVERY LOCATION |
| 0142 | 1A | | LD | A,(DE) | READ PROCESSOR STATUS |
| 0143 | CB77 | | BIT | 6,A | PARITY ERROR? |
| 0145 | C26303 | | JP | NZ,RLOAD | YES, RELOAD |
| 0148 | 23 | | INC | HL | |
| 0149 | 7C | | LD | A,H | |
| 014A | FE28 | | CP | 28H | DONE YET? |
| 014C | 20F3 | | JR | NZ,CKLOOP-$ | NO, KEEP READING |
| 014E | 210220 | | LD | HL,TEST | YES, NO PARITY ERRORS |
| 0151 | 3E55 | | LD | A,55H | CHECK TEST LOCATIONS, |
| 0153 | BE | | CP | (HL) | IF FAIL GOTO |
| 0154 | C26303 | | JP | NZ,RLOAD | RELOAD PROGRAM |
| 0157 | 2C | | INC | L | |
| 0158 | 3EAA | | LD | A,0AAH | |
| 015A | BE | | CP | (HL) | |
| 015B | C26303 | | JP | NZ,RLOAD | |
| 015E | 320050 | WAITP | LD | (WDOG),A | KICK WATCHDOG |
| 0161 | 312020 | | LD | SP,TEMP2 + 1 | POINT SP AT TEMP 2 + 1 |
| 0164 | FB | | EI | | ENABLE INTR |
| 0165 | 18F7 | | JR | WAITP-$ | WAIT FOR INTR |

*Note:
1AH represents 1A in hexadecimal notation.

Appendix B

RELOAD ROUTINE

| Address | Contents | | Instruction Mnemonic | | Comment |
|---|---|---|---|---|---|
| 0363 | F3 | RLOAD | DI | | DISABLE MASKABLE INTR |
| 0364 | 320070 | | LD | (PARI),A | DISABLE NON-MASKABLE INTR |
| 0367 | 210030 | | LD | HL,EAR | POINT HL AT EAROM |
| 036A | 110020 | | LD | DE,USERA | POINT DE AT RAM |
| 036D | 010008 | | LD | BC,8φφH | LOAD ALL 2K |
| 0370 | EDB0 | | LDIR | | TRANSFER FROM EARON TO RAM |
| 0372 | 3A0050 | | LD | A,(STATP) | FETCH PROC. STATUS |
| 0375 | CB57 | | BIT | 2,A | LOAD MODE? |
| 0377 | C27402 | | JP | NZ,LOADMO | YES,GO LOAD NEW PROG. |
| 037A | C32801 | | JP | SYSCK | DONE,RE-INIT AND CHECK |

Appendix C

LOAD NEW PROGRAM ROUTINE

| Address | Contents | | Instruction Mnemonic | | Comment |
|---|---|---|---|---|---|
| 0274 | F3 | LOADMO | DI | | DISABLE INTERRUPT |
| 0275 | 310048 | | LD | SP,4800H | POINT STAC AT EMPTY MEM |
| 0278 | 211820 | | LD | HL, FLAG | FLAG REGISTER ADDR IN HL |
| 0278B | CBCE | | SET | 1,(HL) | SET LOAD MODE FLAG |

Appendix C-continued

LOAD NEW PROGRAM ROUTINE

| Address | Contents | | Instruction Mnemonic | | Comment |
|---------|----------|------|-----|------------------|---------|
| 027D | 210220 | | LD | HL,TEST | BEFORE ENTERING LOAD |
| 0280 | 3E55 | | LD | A,55H | MODE, MUST CHECK |
| 0282 | BE | | CP | (HL) | TO SEE IF PROGRAM |
| 0283 | C29002 | | JP | NZ,EATST | ALREADY EXISTS IN |
| 0286 | 2C | | INC | L | RAM. |
| 0287 | 3EAA | | LD | A,0AAH | IF NOT, MUST ALSO |
| 0289 | BE | | CP | (HL) | CHECK IF PROGRAM |
| 028A | C29002 | | JP | NZ,EATST | IN EAROM, IF SO, |
| 028D | C3A302 | | JP | LODLP | LOAD IT FIRST, THEN |
| 0290 | 210230 | EATST | LD | HL,TEST + 1000H | GO TO LOAD MODE |
| 0293 | 3E55 | | LD | A,55H | |
| 0295 | BE | | CP | (HL) | |
| 0296 | C2A302 | | JP | NZ,LODLP | |
| 0299 | 2C | | INC | L | |
| 029A | 3EAA | | LD | A,0AAH | |
| 029C | BE | | CP | (HL) | |
| 029D | C2A302 | | JP | NZ,LODLP | |
| 02A0 | C36303 | | JP | RLOAD | |
| 02A3 | FB | LODLP | EI | | RETURN FROM INTERUPT HERE |
| 02A4 | 3A0120 | | LD | A,(BLKCT) | CHECK IF INS/REM NEEDED |
| 02A7 | FE00 | | CP | 0 | BLOCK COUNT # ZERO? |
| 02A9 | C2680B | | JP | NZ,INSTRM | YES, TO TO IT |
| 02AC | 210050 | | LD | HL,STATP | STATUS PORT ADDR IN HL |
| 02AF | CB56 | | BIT | 2,(HL) | LOAD MODE? |
| 02B1 | CA2801 | | JP | Z,SYSCK | RE-INIT, CHECK AND GO |
| 02B4 | 210040 | | LD | HL,PBSTA | YEST,CHECK IF LOAD BUTTON PUSH |
| 02B7 | CB7E | | BIT | 7,(HL) | LOAD BUTTON PUSHED? |
| 02B9 | 20E8 | | JR | NZ,LODLP-$ | NO,CONTINUE LOOP |
| 02BB | F3 | | DI | | YES, DISABLE INTERRUPTS |
| 02BC | 210038 | | LD | HL,EAR + 800H | SET UP TO ERASE EARON -ST BL |
| 02BF | 7E | | LD | A,(HL) | START ERASE OPERATION |
| 02C0 | 21003C | | LD | HL,EAR + 0C00H | SET UP TO ERASE EAROM -2ND BLK |
| 0203 | 7E | | LD | A,(HL) | START ERASE OPERATION |
| 0204 | | | TENMS | | DELAY TEN MILLISECONDS |
| 02D2 | 210030 | | LD | HL,EAR | SET UP TO READ EAROM |
| 02D5 | 7E | | LD | A,(HL) | TERMINATE ERASE |
| 02D6 | 210034 | | LD | HL,EAR + 400H | SET UP TO READ EAROM |
| 02D9 | 7E | | LD | A,(HL) | TERMINATE ERASE |
| 02DA | 210020 | | LD | HL,USERA | STARTING ADDR OF USER PRO |
| 02DD | 110030 | | LD | DE,EAR | STARTING ADDR OF EAROM CO |
| 02E0 | 7E | COPYLP | LD | A,(HL) | GET WORD OF CUSTOMER PROG |
| 02E1 | 12 | | LD | (DE),A | START WRITE IN EAROM |
| 02E2 | | | ONEMS | | DELAY ONE MS |
| 02E8 | 4F | | LD | C,A | DAMNED ADDRESSING! |
| 02E9 | 1A | | LD | A,(DE) | TERMINATE WRITE, READ FOR |
| 02EA | B9 | | CP | C | EAROM = RAM? |
| 02EB | 200A | | JR | NZ,COPYER-$ | NO, BLOW IT AWAY |
| 02ED | 23 | | INC | HL | BUMP RAM POINTER |
| 02EE | 13 | | INC | DE | BUMP EAROM POINTER |
| 02EF | 7A | | LD | A,D | CHECK ADDR FOR |
| 02F0 | FE38 | | CP | 38H | HIGHEST LOC, IN EAROM |
| 02F2 | 20EC | | JR | NZ,COPYLP-$ | NOT DONE, LOOP |
| 02F4 | C32801 | | JP | SYSCK | END OF PROG, GO INTIT ALL A |
| 02F7 | 3E3F | COPYER | LD | A,3FH | LOAD BREAK COMMAND |
| 02F9 | 320160 | | LD | (UCA),A | SEND BREAK CHARACTER |
| 02FC | CBA8 | | RES | 5,B | RESET B5 AND |
| 02FE | CBB0 | | RES | 6,B | B6 FLAGS |
| 0300 | C3A302 | | JP | LODLP | |
| 0303 | FB | WAIT | EI | | WAIT FOR NMI |
| 0304 | 18FD | | JR | WAIT-$ | OR INTR |

Appendix D

ERROR ROUTINE

| Address | Contents | | Instruction Mnemonic | | Comment |
|---------|----------|-------|-----|----------|---------|
| 0260 | F3 | ERROR | DI | | DISABLE INTERRUPT |
| 0261 | 3A0050 | | LD | A,(STATP) | RE-LOAD PROCESSOR STATUS |
| 0264 | CB77 | | BIT | 6,A | PARITY ERROR? |
| 0266 | C26303 | | JP | NZ,RLOAD | YES,RELOAD RAM |
| 0269 | CB6F | | BIT | 5,A | TIMEOUT? |
| 026B | CA2801 | | JP | Z,SYSCK | YES,RE-INIT AND CHK |
| 026E | C36003 | | JP | RLOAD | JUMP TO RELOAD |

Appendix E

MICROPROCESSOR ADDRESS CONSTANTS

| Mnemonic | Address (Hexadecimal) | Name |
|---|---|---|
| INTH | 0000 | INTERPRETER ROUTINE HI-ADDRES |
| OPRH | 0020 | OPERAND HI-ADDRESS |
| STATP | 5000 | PROCESSOR STATUS INPUT |
| WDOG | 5000 | WATCH DOG TIMER |
| RAM | 2000 | RAM ADDRESS |
| IMAG | 2020 | I/O IMAGE TABLE ADDRESS |
| USERA | 2000 | USER RAM FOR PROG PANEL |
| USER | 2900 | USER PROG STARTING ADDR |
| TEST | 2002 | ADDRESS OF 1ST TEST WORD |
| STAT | 2004 | ADDRESS STATUS WORD |
| AOON | 2005 | ADDRESS OF OUTPUT ON MASK |
| AOOF | 2008 | ADDRESS OF OUTPUT OFF MASK |
| AION | 200B | ADDR. OF INPUT ON MASK |
| AIOF | 200E | ADDR. OF INPUT OFF MASK |
| WADL | 2011 | STORAGE FOR LO-BYTE ADDR. |
| WADH | 2012 | AND HI-BYTE ADDR FROM PANEL |
| WDATA | 2013 | STORAGE FOR 1ST 4-BIT DATA |
| OUTLO | 2014 | PLC-2 LOOKALIKE WINNER |
| TEMP1 | 201E | TEMPORARY STORAGE #1 |
| TEMP2 | 201F | TEMPORARY STORAGE #2 |
| TEMP3 | 201C | TEMPORARY STORAGE #3 |
| TEMP4 | 201D | TEMPORARY STORAGE #4 |
| IOPI | A400 | I/O PORT ADDR. (INPUT) |
| IOPO | 8400 | I/O PORT ADDR. (OUTPUT) |
| NBR | 0020 | NO. OF I/O BYTES |
| UCA | 6001 | USART CONTROL ADDRESS |
| UDA | 6000 | USART DATA ADDRESS |
| PARI | 7000 | PARITY RESET PORT (NOT ONLY RESETS PARITY THIS ALSO SETS TIMOUT) |
| COMD | 0037 | USART COMMAND WORD |
| FLGTBL | 20C0 | FLAG TABLE ADDR |
| FLGIOO | C000 | SYSTEM FLAG OUTPUT ADDR. |
| FLGIOI | E000 | SYSTEM FLAG INPUT ADDR. |
| PBSTA | 4000 | P.B. SWITCH STATUS |
| EAR | 3000 | EAROM STARTING ADDRESS |
| WRDCNT | 0040 | NO. OF BYTES IN FLAG TABL |
| MODE | 007E | USART MODE WORD |
| BLKCT | 2001 | BLOCK COUNT FOR INS/REM |
| LSTRM | 27DF | LAST VALID RAM ADDRESS |
| RAMEND | 0027 | HIGHEST VALID MEMADDR |
| IRADD | 2016 | INSERT/REMOVE ADDRESS |
| IRSIZ | 2015 | INSERT/REMOVE WORD COUNT |
| FLAG | 2018 | FLAG REGISTER |

Appendix F

COMPONENT APPENDIX

| Component | Reference Number | Description |
|---|---|---|
| Microprocessor | 36 | Z-80A CPU manufactured by Zilog |
| RAM | 40 | Four 2114 1024 X 4-bit random-access memories manufactured by Intel Corporation and two 2102 1024 X 1-bit random-access memories manufactured by Intel Corporation |
| ROM | 45 | Four 82S181 1K X 8-bit programmable read-only memories manufactured by Signetics |
| EAROM | 49 | Four 3400 1K X 4-bit electrically alter-able read-only memories manufactured by General Instrucments, Inc. |
| Mapping PROM | 69 | SN74S472 512-line X 8-bit prorammable read-only memory manufactured by Texas Instruments, Inc. |
| 3-line-to-8-line decoder | 82 | SN74LS138 3-to-8-line decoder manufactured by Texas Instruments, Inc. |
| 2-line-to-4-line-decoders | 87, 117, 158 | Two SN74LS139 dual 2-to-4-line decoder manufactured by Texas Instruments, Inc. |
| Parity generator | 122 | SN74LS280 nine-bit odd/even parity generator manufactured by Texas Instruments, Inc. |
| Buffers | 37, 94 | Two SN74LS244 octal buffers and line drivers manufactured by Texas Instruments, Inc. |
| Bidirectional buffers | 38 | 8304 Octal bidirectional buffers/line drivers manufactured by National Semiconductor, Inc. |
| Flip-flops | 95–97 | SN74LS279 quad S-R latches manufactured by Texas Instruments, Inc. |
| NOR gates | 106–108 | SN24LS02 quad 2-input positive NOR gates manufactured by Texas Instruments, Inc. |
| OR gates | 85, 90–92, 112 | Two SN74LS32 quad 2-input positive OR |

Appendix F-continued

COMPONENT APPENDIX

| Component | Reference Number | Description |
|---|---|---|
| | | gates manufactured by Texas Instruments, Inc. |
| Flip-flop | 129 | SN7474 dual D-type positive-edge-triggered flip-flops manufactured by Texas Instruments, Inc. |
| NAND gates | 155, 156, 157 | SN74LS132 quad 2-input positive NAND gates manufactured by Texas Instruments, Inc. |
| NAND gate | 125 | SN74LS00 quad 2-input positive NAND gates manufactured by Texas Instruments, Inc. |
| NAND gate | 137 | SN7401 quad 2-input open-collector NAND gates manufactured by Texas Instruments, Inc. |
| Multivibrator | 130 | SN74LS123 dual retriggerable monostable multivibrators manufactured by Texas Instruments, Inc. |
| Inverters | 140, 143, 144 and 146 | SN7406 hex inverters with open collectors manufactured by Texas Instruments, Inc. |
| Inverters | 145 | SN74LS14 hex Schitt-trigger inverters manufactured by Texas Instruments, Inc. |
| Inverters | 109 | SN7404 hex inverters manufactured by Texas Instruments, Inc. |
| Gate | 114 | SN74125 quad bus buffer gates manufactured by Texas Instruments, Inc. |

We claim:

1. An improved digital controller of the type having a random-access read/write memory which stores control data that is used in controlling a machine, wherein the improvement comprises:

an erasable, read-mostly memory, for nonvolatile storage of control data;

loading means coupled to both the read/write memory and the read-mostly memory for transferring control data from the read/write memory into the read-mostly memory to form a non-volatile master copy;

data-checking means coupled to the read/write memory for verifying the control data in the read/write memory; and reloading means, coupled to both the read/write memory and the read-mostly memory and responsive to a failure of the data-checking means to verify the control data in the read/write memory, for transferring the master copy of control data from the read-mostly memory into the read/write memory.

2. The improved controller of claim 1, wherein the data-checking means is operable to verify the control data in the read/write memory before this data is used in controlling the machine.

3. The improved controller of claim 1, further comprising:

watchdog timer means for generating fault signals in response to faults that occur during operation of the controller;

wherein the data-checking means is responsive to a watchdog fault signal for testing the control data in the read/write memory; and wherein the reloading means is operable to transfer a master copy of control data from the read-mostly memory into the read/write memory if the control data in the read/write memory is not verified by the data-checking means.

4. The improved controller of claim 1, further comprising:

mode selection means having a LOAD position and an alternate position; and wherein the loading means is responsive to sense the position of the load selection means, the loading means being operable, only when the mode selection means is in its LOAD position, to erase a previously stored master copy of control data in the read-mostly memory and to write updated control data into the read-mostly memory to form a new master copy of control data.

5. The improved controller of claim 1, further comprising:

a user-operable LOAD control; and wherein the loading means is responsive to sense the status of the user-operable LOAD control prior to the transfer of control data from the read/write memory to the read-mostly memory, so that such transfer is conditioned upon the operation of the LOAD control by the user.

6. The improved controller of claim 1, wherein the control data transferred between the read/write memory and the read-mostly memory includes a block of control program instructions for controlling a machine.

7. A digital controller for controlling I/O devices on a machine through execution of control program instructions, the controller comprising:

a read/write program memory which stores status data representing the status of the I/O devices on the machine and which stores control program instructions;

a read-only memory which stores a plurality of processor instructions;

an erasable, read-mostly archive memory for nonvolatile storage of the control program instructions; and controller processor means coupled to the read/write program memory, coupled to the read-only memory and coupled to the read-mostly archive memory, wherein the controller processor means reads the control program instructions from the read/write program memory and executes the control program instructions to operate on the status data, wherein the controller processor means is responsive to selected processor instructions in the read-only memory to copy program instructions from the read/write program memory into nonvolatile storage in the read-mostly archive memory, wherein the controller processor means is further responsive to other selected processor instructions in the read-only memory to verify the integrity of the control program instructions stored in the read/write program memory, and wherein the controller processor means is further responsive to other selected processor instructions in the read-only memory to reload the copied program instructions from the read-mostly archive memory into the read/write program memory in response to a failure to verify the integrity of the control program instructions stored in the read/write program memory.

8. The digital controller of claim 7, further comprising:
mode selection means having a LOAD position and an alternate position;
further comprising means for coupling the mode selection means to the processor means;
wherein the controller processor means includes enabling circuit means for controlling write and erase functions on the read-mostly memory; and
wherein the controller processor means is further responsive to selected processor instructions to read the status of the mode selection means, and is further responsive to other selected processor instructions to signal the enabling circuit means to disable the write and erase functions on the read-mostly memory when the mode selection means is in its alternate position to prevent spurious overwriting of any of the contents of the read-mostly memory.

9. The digital controller of claim 7, further comprising:
a user-operable LOAD control;
further comprising means for coupling the LOAD control to the processor means; and
wherein the controller processor means is further responsive to other selected processor instructions to sense the status of the LOAD control prior to the transfer of control program instructions from the read/write memory to the read-mostly memory, so that such transfer is conditioned upon the operation of the LOAD control by the user.

10. The digital controller of claim 7, further comprising:
fault detection circuit means coupled to both processor means and the read/write memory, the fault detection circuit means being responsive to the detection of faults to generate nonmaskable interrupt signals to the processor means, the fault detection circuit means also being responsive to a signal to inhibit the generation of such nonmaskable interrupt signals; and
wherein the processor means is responsive to a selected processor instruction in the read-only memory to generate the signal to the fault detection means to inhibit the generation of such nonmaskable interrupt signals during the response of the processor means to processor instructions for reloading the copied control program instructions from the read-mostly memory into the random-access memory.

11. The digital controller of claim 7, wherein the read-mostly memory is an electronic memory.

12. In a digital controller for controlling a machine through input and output devices thereon, a programmable module which is electrically coupled to the input and output devices and which executes control program instructions to operate on data representing the status of the output devices in response to data representing the status of the input devices, the programmable module comprising:
a read/write program memory which stores input status data representing the status of the input devices and output status data representing the status of the output devices and which stores control program instructions;
a read-only memory which stores a plurality of processor instructions;
an erasable, read-mostly archive memory for nonvolatile storage of control program instructions;
an address bus and a data bus;
controller processor means coupled through both the address bus and the data bus to each of said memories, and
program panel interface means coupled to both the controller processor means and to the read/write program memory through the data bus and further coupled to the controller processor through an interrupt control line,
wherein the controller processor means reads the control program instructions from the read/write program memory and executes the control program instructions to examine input status data and determine output status data, wherein the controller processor means is responsive to selected processor instructions in the read-only memory to sequentially couple addresses through the address bus to the read/write program memory and to the read-mostly archive memory to copy program instructions from the read/write program memory into nonvolatile storage in the read-mostly archive memory through the data bus, wherein the controller processor means is further responsive to other selected processor instructions in the read-only memory to sequentially couple addresses through the address bus to the read/write program memory and to the read-mostly archive memory to reload the copied program instructions from the read-mostly archive memory into the read/write program memory through the data bus, and
wherein the controller processor means is further responsive to an interrupt signal generated by the program panel interface means to couple original and edited program instructions through the data bus between the program panel interface means and the read/write program memory, prior to copying such instructions into the read-mostly archive memory.

* * * * *

UNITED STATES PATENT AND TRADEMARK OFFICE
CERTIFICATE OF CORRECTION

PATENT NO.  : 4,291,388
DATED       : September 22, 1981
INVENTOR(S) : Ecker, Jr., Donald R., et al It is certified that error appears in the above—identified patent and that said Letters Patent is hereby corrected as shown below:

In Fig. 2, the numeral "55" should be deleted where it identifies the INT terminal on program panel interface 50.

Column 1, line 54 - "operations" should be --operation--.

Column 11, line 13 - "alternatively" should be --alternately--.

Column 11, line 40 - "49" should be --47--.

Column 12, lines 47-50 - "FETCH" should appear as --FETCH:-- within Table 2 in line 48 in the margin before the column with the heading "Instruction Mnemonic".

Column 14, line 62 - "deterine" should be --determine--.

In Appendix B, Columns 15 and 16, line 6 under Comment "EARON" should be --EAROM--.

In Appendix C, Column 18, line 02A9 under Comment "TO TO IT" should be --GO TO IT--.

Appendix C - Column 18, line 02B4 under Comment "YEST," should be --YES,--.

Appendix C - Column 18, line 02BC under Comment "EARON" should be --EAROM-- and "-ST" should be --1ST--.

UNITED STATES PATENT AND TRADEMARK OFFICE
CERTIFICATE OF CORRECTION

PATENT NO. : 4,291,388
DATED : September 22, 1981
INVENTOR(S) : Ecker, Jr., Donald R., et al It is certified that error appears in the above—identified patent and that said Letters Patent is hereby corrected as shown below:

Appendix C - Column 17, line 0203 - "0203" should be --02C3--.

Appendix C - Column 17, line 0204 - "0204" should be --02C4--.

Appendix F - Column 20, Line Mapping PROM under Description - "prorammable" should be --programmable--.

Column 21, line 68 - "load" should be --mode--.

Signed and Sealed this

Sixteenth Day of February 1982

|SEAL|

Attest:

GERALD J. MOSSINGHOFF

Attesting Officer

Commissioner of Patents and Trademarks